United States Patent
Kweon et al.

(10) Patent No.: US 12,059,091 B2
(45) Date of Patent: Aug. 13, 2024

(54) COOKING APPARATUS

(71) Applicant: SAMSUNG ELECTRONICS CO., LTD., Suwon-si (KR)

(72) Inventors: Soon Cheol Kweon, Suwon-si (KR); Sang Gyun Ye, Suwon-si (KR); Seung Woo Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 366 days.

(21) Appl. No.: 16/673,006

(22) Filed: Nov. 4, 2019

(65) Prior Publication Data

US 2020/0138229 A1 May 7, 2020

(30) Foreign Application Priority Data

Nov. 2, 2018 (KR) .................... 10-2018-0133642

(51) Int. Cl.
*A47J 27/04* (2006.01)
*F22D 5/08* (2006.01)

(52) U.S. Cl.
CPC .............. *A47J 27/04* (2013.01); *F22D 5/08* (2013.01); *A47J 2027/043* (2013.01)

(58) Field of Classification Search
CPC ....... A47J 2027/043; A47J 27/04; F22D 5/08; F24C 15/327; F24C 13/00; F24C 15/00; F24C 15/32; F24C 7/00; F22B 1/08; F22B 1/28; F27D 17/00
See application file for complete search history.

(56) References Cited

U.S. PATENT DOCUMENTS 10,281,159 B2 *  5/2019  Park ................. F24C 15/327
10,645,765 B2 *  5/2020  Shibuya ................ H05B 6/80
10,835,072 B2 * 11/2020  Shibuya ............. F24C 15/327

(Continued)

FOREIGN PATENT DOCUMENTS

CN    105841502       8/2016
EP    2 103 878 A1    9/2009

(Continued)

OTHER PUBLICATIONS

"Shim, Cooking Device and its Control Method, 2006" (Year: 2006).*

(Continued)

*Primary Examiner* — Janie M Loeppke
*Assistant Examiner* — Abigail H Rhue
(74) *Attorney, Agent, or Firm* — STAAS & HALSEY LLP

(57) ABSTRACT

A cooking apparatus which includes a steam generator, and a water supply device to supply water to the steam generator, and a water supply control valve arranged between the water supply device and the steam generator and configured to adjust a level of water in the steam generator. The water supply control valve includes a housing, an inlet portion, and a float configured to move within the housing to open the inlet portion while a level of water in the housing is at a first level and move to move within the housing to close the inlet portion while the level of water in the housing is at a second level above the first level where the buoyancy of the float is greater than the gravity caused by the weight of the water supplied by the water supply device and to the water supply control valve.

13 Claims, 15 Drawing Sheets

(56) References Cited

U.S. PATENT DOCUMENTS

| | | | |
|---|---|---|---|
| 11,382,449 B2* | 7/2022 | Lee | F24C 15/327 |
| 2007/0114222 A1* | 5/2007 | Shon | A21B 3/04 |
| | | | 219/401 |
| 2015/0204547 A1 | 7/2015 | Raggi | |
| 2020/0281355 A1* | 9/2020 | Carnevali | A47J 27/04 |

FOREIGN PATENT DOCUMENTS

| | | | |
|---|---|---|---|
| JP | 2008-2737 | | 1/2008 |
| JP | 2010-32120 | | 2/2010 |
| JP | 2010-38405 | | 2/2010 |
| JP | 2010038405 A | * | 2/2010 |
| JP | 2014-219144 | | 11/2014 |
| KR | 20-0423374 | | 8/2006 |
| KR | 20080012601 A | * | 8/2006 |
| KR | 10-2008-0012601 | | 2/2008 |
| KR | 10-2010-0009855 | | 1/2010 |
| KR | 20-2011-0000890 | | 1/2011 |
| KR | 10-2012-0122141 | | 11/2012 |
| KR | 101283941 B1 | * | 4/2013 |

OTHER PUBLICATIONS

"Furukawa, Steam generator and cooker, 2010" (Year: 2010).*
"Kim, Hot Water Circulation Apparatus, 2013" (Year: 2013).*
International Search Report dated Mar. 4, 2020 in International Patent Application No. PCT/KR2019/014757.
European Office Action dated Nov. 13, 2021 in European Patent Application No. 19 206 761.9.
Korean Office Action Sep. 18, 2022 in Korean Patent Application No. 10-2018-0133642 (5 pages; 6 pages English translation).
Office Action dated Feb. 3, 2023 in European Patent Application No. 19 206 761.9 (7 pages).
Notice of Allowance dated Aug. 1, 2023 in Korean Patent Application No. 10-2018-0133642.
Office Action dated Sep. 25, 2023 in European Patent Application No. 19 206 761.9.

* cited by examiner

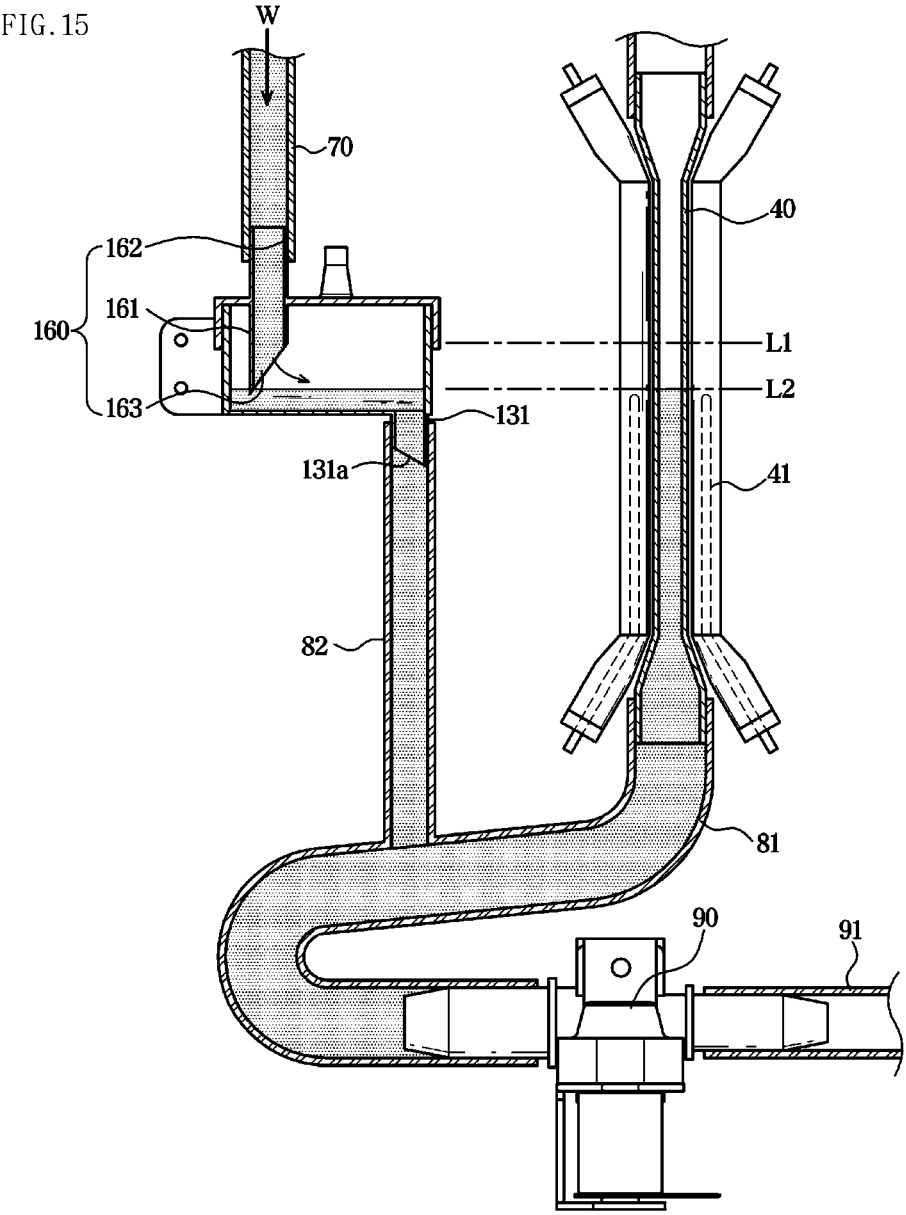

COOKING APPARATUS

CROSS-REFERENCE TO RELATED APPLICATION(S)

This application is based on and claims priority under 35 U.S.C. § 119 to Korean Patent Application No. 10-2018-0133642, filed on Nov. 2, 2018, in the Korean Intellectual Property Office, the disclosure of which is incorporated by reference herein in its entirety

BACKGROUND

1. Field

The disclosure relates to a cooking apparatus capable of cooking food, and more particularly, to a steam cooker capable of cooking food using steam.

2. Description of Related Art

Generally, heating cooking apparatuses used to cook food include a microwave oven using a high frequency, and an oven designed to directly apply heat to food using a heater. The microwave oven has many limitations on the types of foods that can be cooked, as well as the foods that dries after cooking, resulting in a poor taste. The oven has excessively long cooking time and low cooking efficiency because it uses air having a relatively low density as a heat transfer medium between the heater and food to be cooked.

Recently, as to compensate for the above described limitations of the conventional heating cooking apparatuses, a heating cooking apparatus configured to supply heat to food using steam, that is, a steam cooker has been developed. When using the steam cooker, it is possible to maintain an appropriate amount of moisture in food, and consequently, it is possible to maintain original taste of food. Further, it is possible to reduce a cooking time because steam filled in a cavity acts as an efficient heat transfer medium.

The steam cooker generally includes a cavity having a cooking space, a steam generator heating water to generate steam, and a steam pipe connecting the steam generator to the cavity to supply steam of the steam generator to the cavity.

SUMMARY

Therefore, it is an aspect of the disclosure to provide a water supply control valve capable of maintaining a certain water level of a steam generator, particularly, capable of easily adjusting the water level of the steam generator without an additional pump or an electrical signal.

Additional aspects of the disclosure will be set forth in part in the description which follows and, in part, will be obvious from the description, or may be learned by practice of the disclosure.

In accordance with an aspect of the disclosure, a cooking apparatus includes a cavity, a steam generator arranged at the rear of the cavity and configured to generate steam, a water supply device arranged above the cavity and configured to supply water to the steam generator, a steam pipe configured to connect the steam generator to the cavity to supply the steam generated by the steam generator to the cavity, a water supply control valve arranged between the water supply device and the steam generator and configured to adjust a water level of the steam generator.

The cooking apparatus includes a water supply pipe configured to connect the water supply device to an upper end of the water supply control valve, a connection pipe configured to connect a lower end of the water supply control valve to a lower end of the steam generator, and a drain valve connected to the connection pipe and configured to discharge water in the water supply control valve, the steam generator, and the connection pipe. The water supply control valve includes a housing, an inlet portion arranged on an upper end of the housing and connected to the water supply pipe, and a float configured to move within the housing to open the inlet portion while a level of water in the housing is at a first level, and move within the housing to close the inlet portion while the level of water in the housing is at a second level above the first level, and a buoyancy of the float is greater than gravity caused by a weight of the water supplied by the water supply device and flowing to the water supply control valve.

The water supply device may be arranged above the water supply control valve.

While the drain valve is in a closed state, the level of water in the housing and the level of water in the steam generator are the same along a vertical direction.

The steam generator may include a heater configured to heat the water in the steam generator, and when the water in the steam generator is evaporated by the heater and the level of water of the steam generator is lowered, the level of water in the housing is lowered in conjunction therewith through the connection pipe, and the float moves downward so as to open the inlet portion.

While the inlet portion is opened, water flows into the water supply control valve through the water supply pipe and the water flowing into the water supply control valve flows into the steam generator through the connection pipe, thereby increasing the level of water in the steam generator.

The float closes the inlet portion when the level of water in the housing is increased to a predetermined height.

The float may include a side surface, wherein one side of the side surface comprises a cutting portion formed to be more spaced apart from an inner surface of the housing than another surface of the float.

The water supply control valve may further include an outlet portion connected to the connection pipe to discharge the water in the housing to an outside of the housing, and arranged below a lower end of the housing to be adjacent to a space between the cutting portion and the inner surface of the housing.

The outlet portion is provided in a tubular shape extending in a lower direction from the lower end of the housing, wherein the outlet portion is provided to be cut obliquely about a vertical direction.

The water supply device may include a water tank configured to store water and a pressure adjustment hole configured to connect the water tank to an outside of the water tank to allow water stored in the water tank to be affected by atmospheric pressure.

The water supply control valve may include a pressure adjustment hole arranged on an upper end of the housing to connect the housing to an outside of the housing to allow water flowing into the housing to be affected by atmospheric pressure.

The float may include an opening and closing portion arranged at an upper end of the float to open and close the inlet portion according to the level of water in the housing.

The connection pipe may include a first connection pipe configured to connect the steam generator to the drain valve, and a second connection pipe connected to the water supply control valve and a part of the first connection pipe.

The cooking apparatus may further include a controller, and the water tank is moveable between a first position in which the water tank is exposed to an outside of the cooking apparatus to receive water, and a second position in which the water tank is inside the water supply device so as to cause water to flow to the water supply pipe, and while the water tank is in the second position, the controller drives the steam generator after a predetermined period of time.

The water supply control valve further may include a rotating member having one side connected to the float, and an opening and closing portion connected to another side, where the rotating member is configured to open and close the inlet portion in conjunction with a vertical movement of the float.

In accordance with another aspect of the disclosure, a cooking apparatus includes a cavity, a steam generator arranged at the rear of the cavity and configured to generate steam, a water supply device arranged above the cavity and configured to supply water to the steam generator, a steam pipe configured to connect the steam generator to the cavity to supply the steam generated by the steam generator to the cavity, a water supply control valve connected to between the water supply device and the steam generator and arranged below the water supply device, a water supply pipe configured to connect the water supply device to an upper end of the water supply control valve, when a level of water level in the water supply control valve is lowered to equal to or less than a predetermined height, water in the water supply pipe flows into an inside of the water supply control valve due to gravity of the water in the water supply pipe and a connection pipe configured to connect a lower end of the water supply control valve to a lower end of the steam generator, the level of water in the water supply control valve and a level of water in the steam generator correspond to each other in a vertical direction.

The water supply control valve may include a housing, and an inlet portion configured to allow water to flow into the housing from the water supply pipe, and the inlet portion comprises an extension tube in a tubular shape that is configured to extend toward the housing.

The extension tube may include an inclined portion cut obliquely about a vertical direction, wherein an upper end of the inclined portion is arranged above a predetermined height although the level of water level in the water supply control valve is lowered equal to or less than the predetermined height.

The water supply control valve may include a housing, an inlet portion arranged on an upper end of the housing and connected to the water supply pipe, and a float configured to move within the housing to open the inlet portion while a level of water in the housing is at a first level and move within the housing to close the inlet portion while the level of water in the housing is at a second level above the first level.

In accordance with another aspect of the disclosure, a cooking apparatus includes a cavity, a steam generator arranged at the rear of the cavity and configured to generate steam, a water supply device arranged above the cavity and configured to supply water to the steam generator, a steam pipe configured to connect the steam generator to the cavity to supply the steam generated by the steam generator to the cavity, a water supply control valve arranged between the water supply device and the steam generator and configured to adjust a water level of the steam generator. The water supply control valve including a housing, an inlet portion arranged on an upper end of the housing and connected to the water supply pipe, an outlet portion, and a float configured to move within the housing to open the inlet portion while a level of water in the housing is at a first level, and move within the housing to close the inlet portion while the level of water in the housing is at a second level above the first level. The float may include an opening and closing portion arranged at an upper end of the float to open and close the inlet portion, and a side having a cutting portion formed by being cut out to be more spaced apart from an inner surface of the housing than another side.

The cooking apparatus includes a water supply pipe configured to connect the water supply device to an upper end of the water supply control valve, a connection pipe configured to connect a lower end of the water supply control valve to a lower end of the steam generator, where the outlet portion of the water supply control valve being connected to the connection pipe to discharge the water in the housing to an outside of the housing, and a drain valve additionally connected to the connection pipe and configured to discharge water in the water supply control valve, the steam generator, and the connection pipe.

BRIEF DESCRIPTION OF THE DRAWINGS

These and/or other aspects of the disclosure will become apparent and more readily appreciated from the following description of embodiments, taken in conjunction with the accompanying drawings of which:

FIG. 15 is a view illustrating a state in which water is supplied to some components of the cooking apparatus according to still another embodiment of the disclosure.

DETAILED DESCRIPTION

Figure 1:
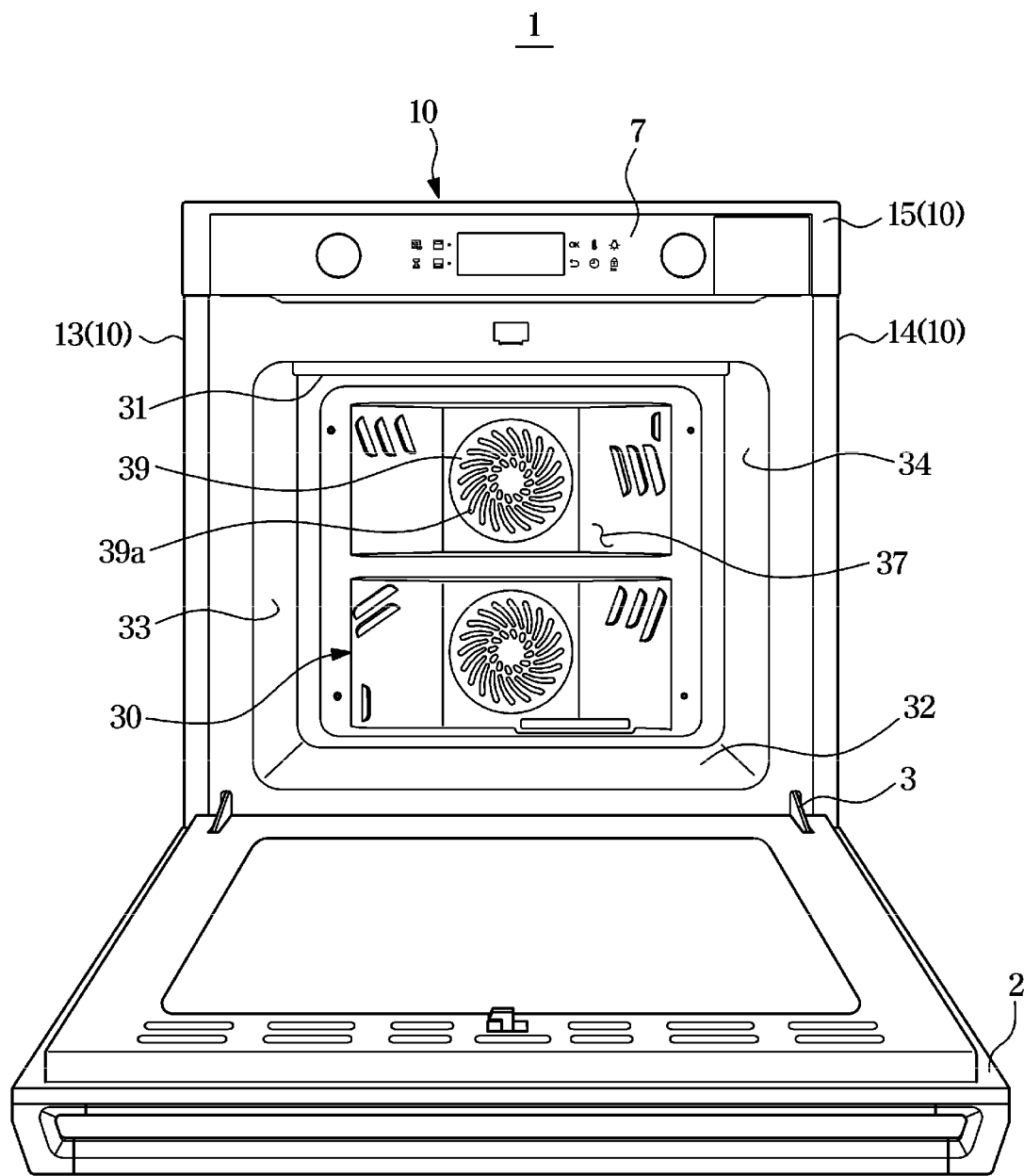
FIG. 1 is a front view of a cooking apparatus according to an embodiment of the disclosure.

Embodiments described in the disclosure and configurations shown in the drawings are merely examples of the embodiments of the disclosure, and may be modified in various different ways at the time of filing of the present application to replace the embodiments and drawings of the disclosure. The singular forms "a," "an" and "the" are intended to include the plural forms as well, unless the context clearly indicates otherwise. In the drawings may be exaggerated for clear description of the shape and size of the elements.

In this disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

Figure 2:
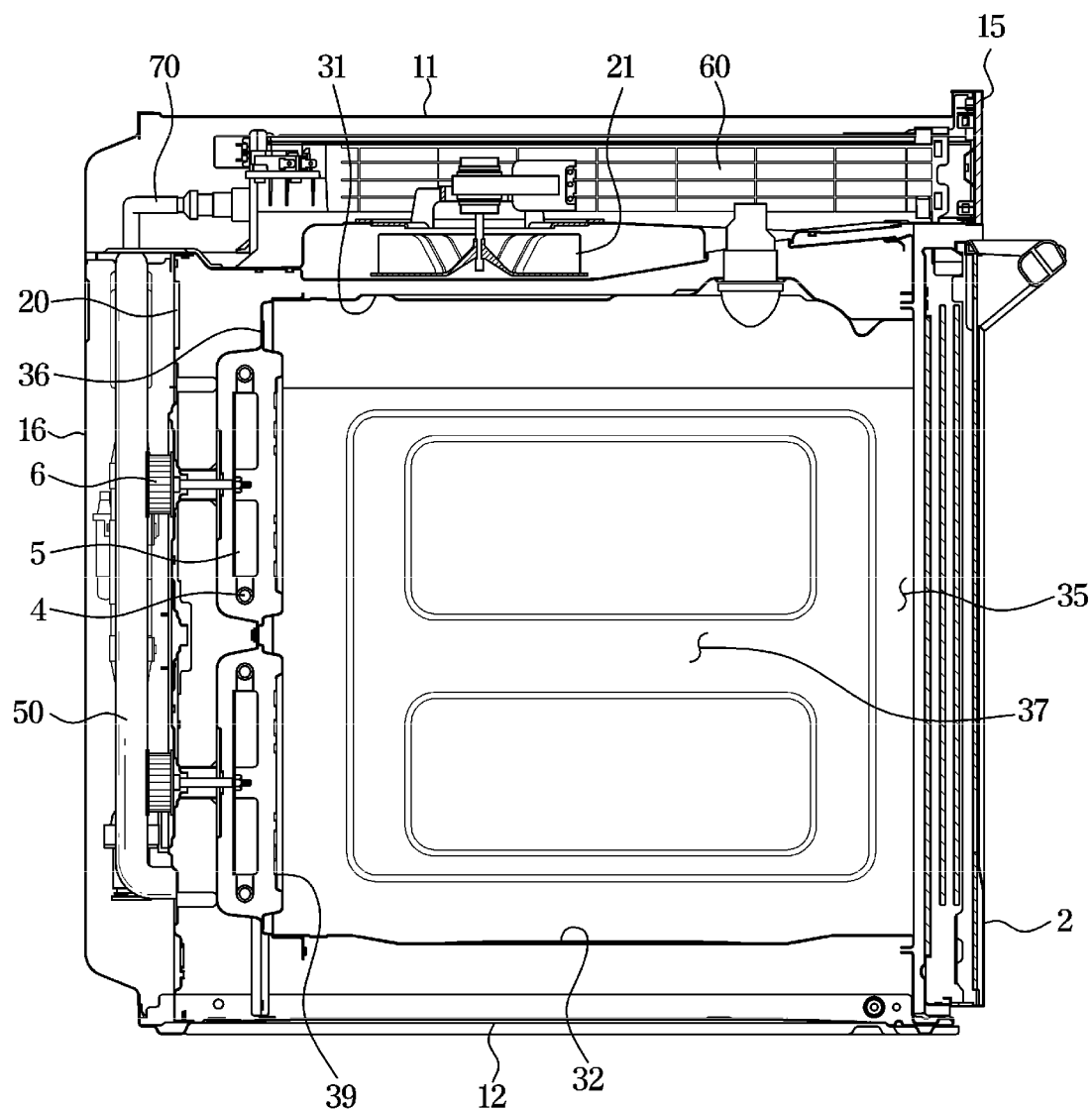
FIG. 2 is a schematic cross sectional view of the cooking apparatus according to an embodiment of the disclosure.
Figure 3:
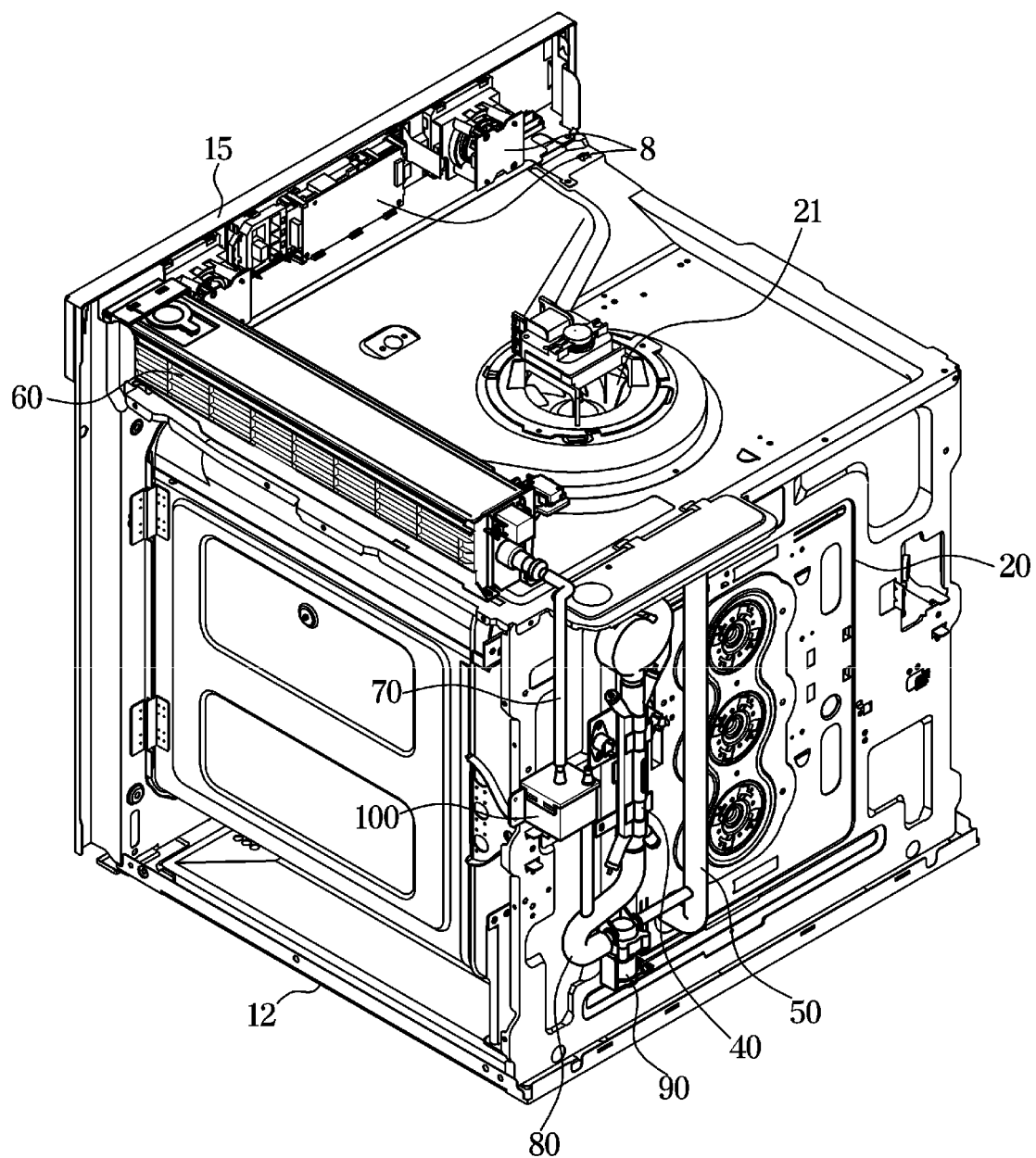
FIG. 3 is a rear perspective view of the cooking apparatus according to an embodiment of the disclosure, illustrating that a portion of a body is omitted.
Figure 4:
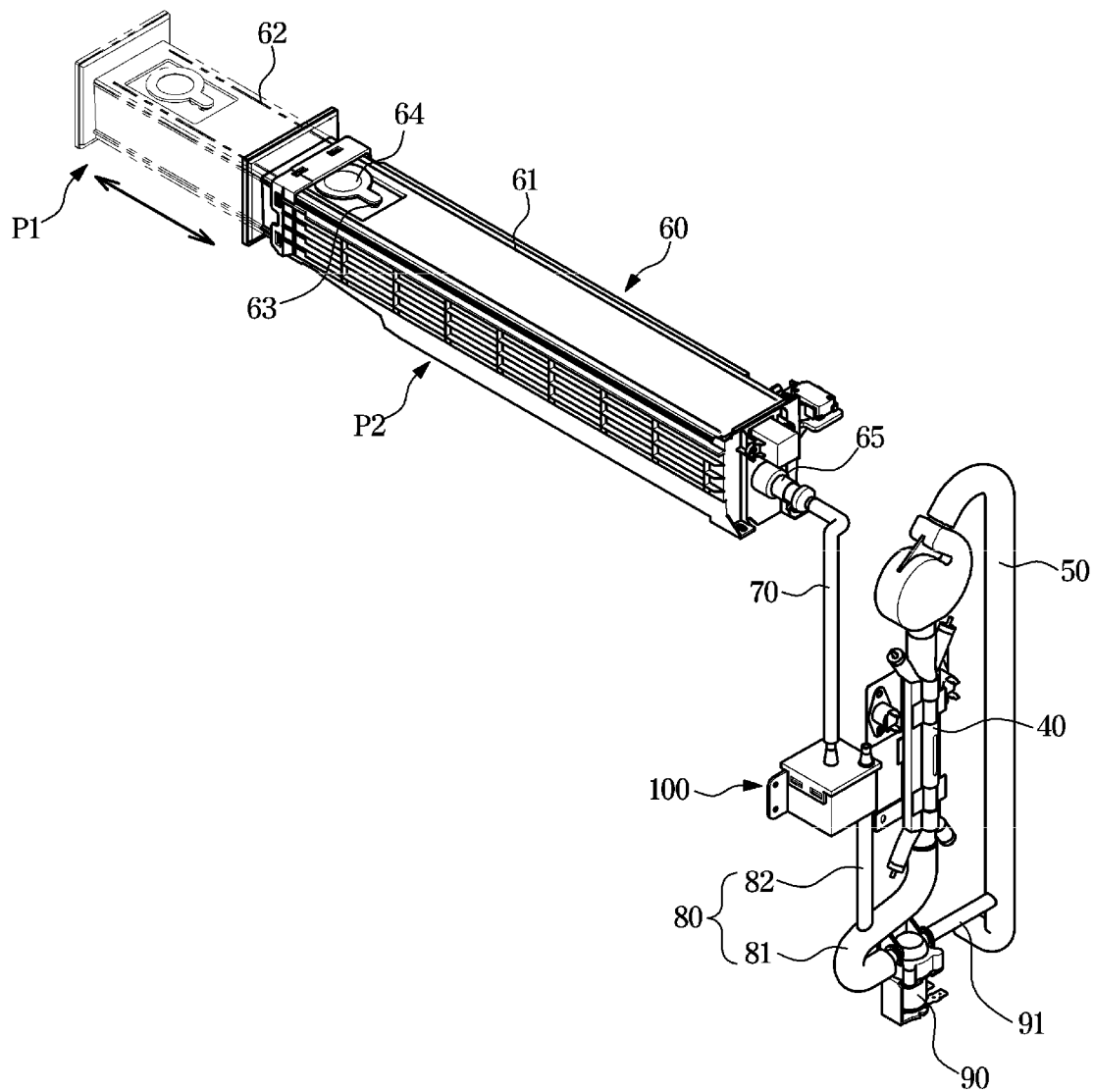
FIG. 4 is a rear perspective view of some components of the cooking apparatus according to an embodiment of the disclosure.

The disclosure will be described more fully hereinafter with reference to the accompanying drawings FIG. 1 is a front view of a cooking apparatus according to an embodiment of the disclosure, FIG. 2 is a schematic cross sectional view of the cooking apparatus according to an embodiment of the disclosure, FIG. 3 is a rear perspective view of the cooking apparatus according to an embodiment of the disclosure, illustrating that a portion of a body is omitted, and FIG. 4 is a rear perspective view of some components of the cooking apparatus according to an embodiment of the disclosure.

Referring to FIGS. 1 to 4, a cooking apparatus 1 includes a body 10, a cavity 30 formed inside the body 10 to cook food, a steam generator 40 configured to generate steam, a steam pipe 50 configured to connect the steam generator 40 to the cavity 30 to supply steam to the inside of the cavity 30, and a discharge pipe (not shown) and a discharge nozzle (not shown) connected to the cavity 30 to discharge steam inside the cavity 30 to the outside.

The body 10 may have a substantially box shape. That is, the body 10 may include an upper plate 11, a lower plate 12, a left plate 13, a right plate 14, a front plate 15, and a rear plate 16. An opening may be formed in the front plate 15 of the body 10 to allow food to be put into and taken out of the cavity 30. A display panel 7 configured to display a state of the cooking apparatus 1 or receive an operation command may be provided on the front plate 15 of the body 10.

The cavity 30 is provided inside the body 10 to accommodate food. The cavity 30 may be provided in a substantially box shape like the body 10. That is, the cavity 30 may include an upper wall 31, a lower wall 32, a left wall 33, a right wall 34, a rear wall 36, and a cooking space 37 formed therein. An opening 35, through which food is put into and taken out, is formed in the front surface of the cavity 30, and the opening 35 may be opened and closed by a door 2. The door 2 may be rotatably coupled to the body 10 through a hinge 3. The door 2 may rotate in a vertical direction.

A cooling fan 21 may be installed in an upper portion of the cavity 30. A rear support plate 20 may be provided at the rear of the cavity 30 to install a convection motor 6, the steam generator 40 and a water supply control valve 100. Alternatively, the rear support plate 20 may be omitted, and the upper wall 31 and the rear wall 36 of the cavity 30 may serve as the rear support plate 20.

A heater 4 heating air, and a convection fan 5 circulating air and steam in the cooking space 37 may be provided at the rear of the cooking space 37 of the cavity 30. A fan cover 39 covering the heater 4 and the convection fan 5 may be arranged in front of the heater 4 and the convection fan 5, and a through hole 39a may be formed in the fan cover 39 to allow air to flow.

The cooling fan 21 may circulate air between the body 10 and the cavity 30 to cool the cavity 30 and various electronic components 8. The cooling fan 21 may be arranged on the rear upper portion of the body 10 and provided in plural.

The steam generator 40 may generate steam by heating water. For the steam generation, the steam generator 40 may include a heater 41 heating water therein. The steam generator 40 may be arranged at the rear side of the cavity 30. Particularly, the steam generator 40 may be coupled to the rear support plate 20.

The cooking apparatus 1 may include a water supply device 60 supplying water to the steam generator 40, a water supply pipe 70 supplying water, which is supplied from the water supply device 60, to the water supply control valve 100 described later, and a connection pipe 80 connecting the water supply control valve 100 to the steam generator 40.

The water supply device 60 may include a water supply housing 61 and a water tank 62 in which water is stored.

The water tank 62 may be coupled to the water supply housing 61 so as to be slidable relative to the water supply housing 61. The water supply housing 61 may communicate with the front plate 15. The water tank 62 may slide in the front of the front plate 15 through the front of the water supply housing 61 and the front plate 15. Accordingly, a user may slide the water tank 62 forward to supply water to the water tank 62.

That is, the water tank 62 may move in a slide manner between a first position P1 in which the water tank 62 is exposed to the outside to receive water from the outside, and a second position P2 in which the water tank 62 is inserted into the inside of the water supply housing 61 to be connected to a water supply valve 65 to supply water to the water pipe 70.

A supply hole (not shown) configured to receive water and a first pressure adjustment hole 63 configured to allow water stored in the water tank 62 to automatically move to the water pipe 70 by the gravity due to the influence of atmospheric pressure may be arranged on an upper portion of the water tank 62.

A cover member 64 covering the supply hole (not shown) and the first pressure adjustment hole 63 may be provided at an upper side thereof.

Upon being arranged at the second position P2, the water tank 62 may communicate with the water supply valve 65 arranged at the rear side of the water supply housing 61. Accordingly, the water stored in the water tank 62 may automatically flow to the water supply pipe 70 by the pressure of gravity and the atmospheric pressure of the stored water.

The water supply pipe 70 may extend in the vertical direction. Water flowing into the water supply pipe 70 may flow along the water supply pipe 70.

Water flowing along the water supply pipe 70 may flow into the water supply control valve 100 arranged below the water supply device 60. The water supply control valve 100 may be arranged between the water supply device 60 and the steam generator 40 to adjust the amount of water flowing from the water supply device 60 to the steam generator 40. This will be described later in detail.

Water discharged from the water supply control valve 100 may flow to the steam generator 40 along the connection pipe 80. In addition, the connection pipe 80 may be connected to a drain valve 90.

The connection pipe 80 may include a first connection pipe 81 provided such that one end thereof is connected to the steam generator 40 and the other end thereof is connected to the drain valve 90, and a second connection pipe 81 provided such that one end thereof is connected to the water supply control valve 100 and the other end thereof is connected to the first connection pipe 81.

Accordingly, the connection pipe 80 may connect the water supply control valve 100, the steam generator 40, and the drain valve 90 to each other.

When the drain valve 90 is in a closed state, water supplied from the water supply device 60 may be maintained in a state of being stored in the water supply control valve 100, the steam generator 40, and the connection pipe 80.

The drain valve 90 may be arranged below the steam generator 40 and the water supply control valve 100. Accordingly, when the drain valve 90 is in an open state, the water stored in the connection pipe 80, the steam generator 40, and the water supply control valve 100 may flow into a drain pipe 91 through the drain valve 90 and then be discharged to the outside.

Hereinafter the water supply control valve 100 will be described in detail.

Figure 5:
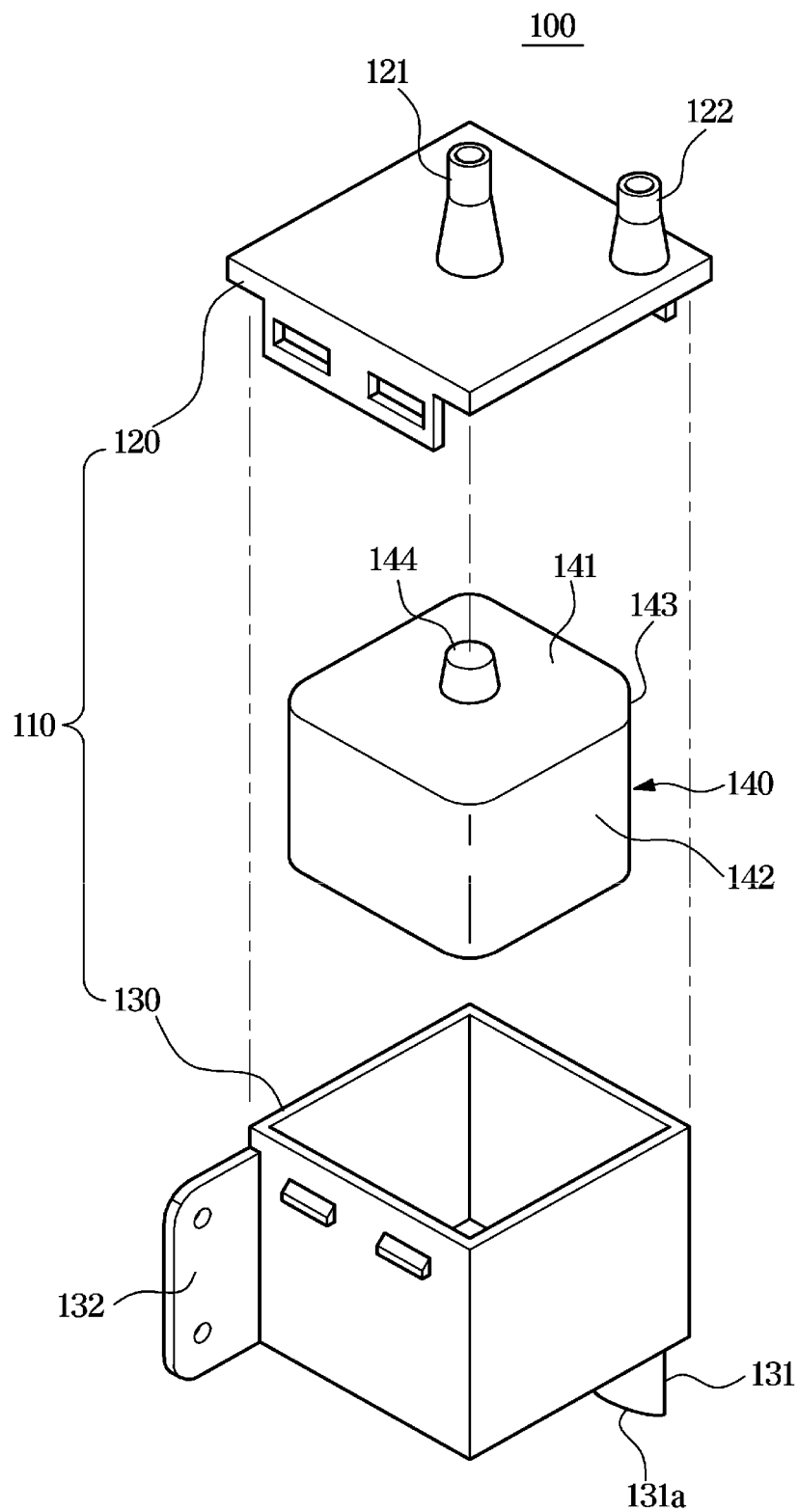
FIG. 5 is an exploded perspective view of a water supply control valve of the cooking apparatus according to an embodiment of the disclosure.
Figure 6:
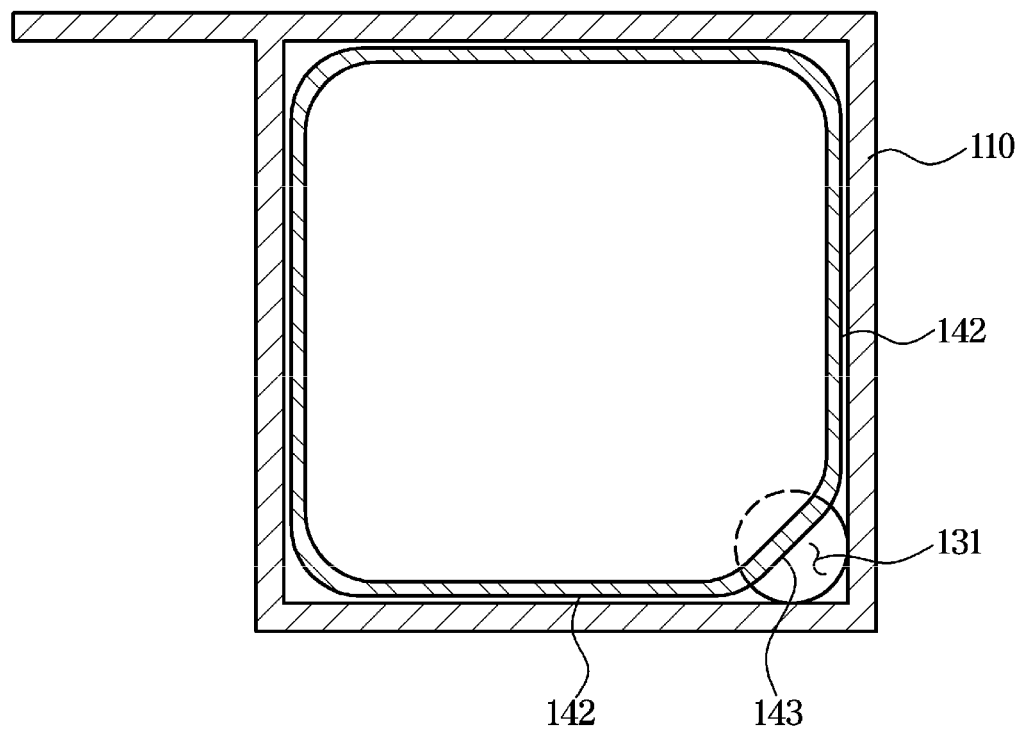
FIG. 6 is a cross-sectional view of the water supply control valve of the cooking apparatus according to an embodiment of the disclosure.

FIG. 5 is an exploded perspective view of a water supply control valve of the cooking apparatus according to an embodiment of the disclosure. FIG. 6 is a cross-sectional view of the water supply control valve of the cooking apparatus according to an embodiment of the disclosure.

The water supply control valve 100 may include a valve housing 110 and a float 140 arranged inside the valve housing 110. The water supply control valve 100 may include a coupling member 132 using which the water supply control valve 100 is coupled to the cooking apparatus 1.

The valve housing 110 may include a first valve housing 120 and a second valve housing 130 so that the float 140 may be inserted into the valve housing 110.

The first valve housing 120 may form an upper portion of the valve housing 110, and the second valve housing 130 may form a lower portion of the valve housing 110.

An inlet portion 121 configured to be connected to the water supply pipe 70 in the vertical direction to allow water to flow into the valve housing 110 may be provided on an upper surface of the first valve housing 120.

In addition, the upper surface of the first valve housing 120 may include a second pressure adjustment hole 122 communicating with the outside to allow water stored in the valve housing 110 to be affected by the atmospheric pressure. By the second pressure adjustment hole 122, the water stored in the valve housing 110 may be affected by the atmospheric pressure to change the water level.

The second valve housing 130 may include an outlet portion 131 configured to allow water in the water supply control valve 100 to flow to the steam generator 40 through the connection pipe 80.

The outlet portion 131 may be provided in a tubular shape extending downward from the lower end of the second valve housing 130.

Accordingly, the water flowing into the water supply control valve 100 through the inlet portion 121 is discharged to the outside of the water supply control valve 100 through the outlet portion 131 and then flows into the steam generator 40 through the connection pipe 80.

Water flowing from the water supply pipe 70 through the inlet portion 121 may flow into the valve housing 110. The float 140 may be provided in an internal space of the valve housing 110 formed by the first valve housing 120 and the second valve housing 130.

The float 140 may move in the vertical direction according to the water level of the water stored in the valve housing 110.

The float 140 may be formed in a shape including an upper surface 141 and a side surface 142. However, the shape of the float 140 is not limited thereto, and thus the float 140 may be provided in various shapes such as a spherical shape.

An opening and closing portion 144 protruding upward to close the inlet portion 121 upon the upward movement of the float 140 may be provided on the upper surface of the float 140.

The opening and closing portion 144 may close an opening of the inlet portion 121 to prevent water from flowing into the water supply control valve 100 through the water supply pipe 70.

In addition, when the float 140 moves to the lower side, the opening and closing portion 144 moves downward in conjunction with the float 140 and opens the opening of the inlet portion 121, thereby allowing water to flow into the inside of the water supply control valve 100 through the water pipe 70.

As described above, when the drain valve 90 is in the closed state, water may be stored in the connection pipe 80, the water supply control valve 100, and the steam generator 40. In this case, the steam generator 40 and the water supply control valve 100 may be arranged at a position substantially corresponding to each other in the vertical direction so that a water level of the steam generator 40 is identical to a water level of the water supply control valve 100.

Accordingly, the water supply control valve 100 may selectively receive water from the water supply device 40 according to the water level of the steam generator 40. This will be described later in detail.

As mentioned above, the water supplied from the water supply device 60 may flow into steam generator 40 through the water supply control valve 100. At this time, the float 140 is arranged inside the water supply control valve 100 and thus water is discharged to the outside through between the float side surface 142 and an inner surface of the valve housing 110. Further, when a certain amount of water is stored in the water supply control valve 100, the stored water may be placed between the float side surface 142 and the inner surface of the valve housing 110. Because a width between the float side surface 142 and the inner surface of the valve housing 110 is narrow, the capillary phenomenon may occur in the water therein.

Accordingly, the water level of the water supply control valve 100 may be raised above the water level of the steam generator 40, which may cause a problem in that the water level of the steam generator 40 may not be accurately measured.

Therefore, the float 140 of the water supply control valve 100 according to an embodiment of the disclosure may include a cutting portion 143 to prevent the capillary phenomenon. The cutting portion is formed in such a way that a part of the float side surface 142 is cut out toward the center of the float 140 so that the part of the float side surface 142 is more spaced apart from the inner surface of the valve housing 110 than a float other side surface.

The cutting portion 143 may be spaced apart from the inner surface of the valve housing 110 by a predetermined distance, thereby preventing the capillary phenomenon in the water stored in the valve housing 110.

In addition, the outlet portion 131 may be arranged adjacent to a position where the cutting portion 143 is arranged. A space between the cutting portion 143 and the inner surfaces of the valve housing 110 may be greater than a space between the float other side surface and the inner surfaces of the valve housing 110, and thus the water stored in the valve housing 110 may be more smoothly discharged to the outside of the valve housing 110 along the outlet portion 131.

In addition, the outlet portion 131 may include a cutout portion 131a formed to be cut obliquely about the vertical direction. That is, the outlet portion 131 may be provided in a tubular shape in which a cross section in the vertical direction is increased from the lower side to the upper side.

This is to prevent the capillary phenomenon in the water stored in the tubular outlet portion 131. Because water does not place on the same line in the vertical direction, the adhesion between the inner circumferential surface of the outlet portion 131 and the stored water may be reduced, thereby preventing the capillary phenomenon.

Hereinafter the characteristic in which the water level of the steam generator 40 is adjusted by the water supply control valve 100 will be described in detail.

Figure 7:
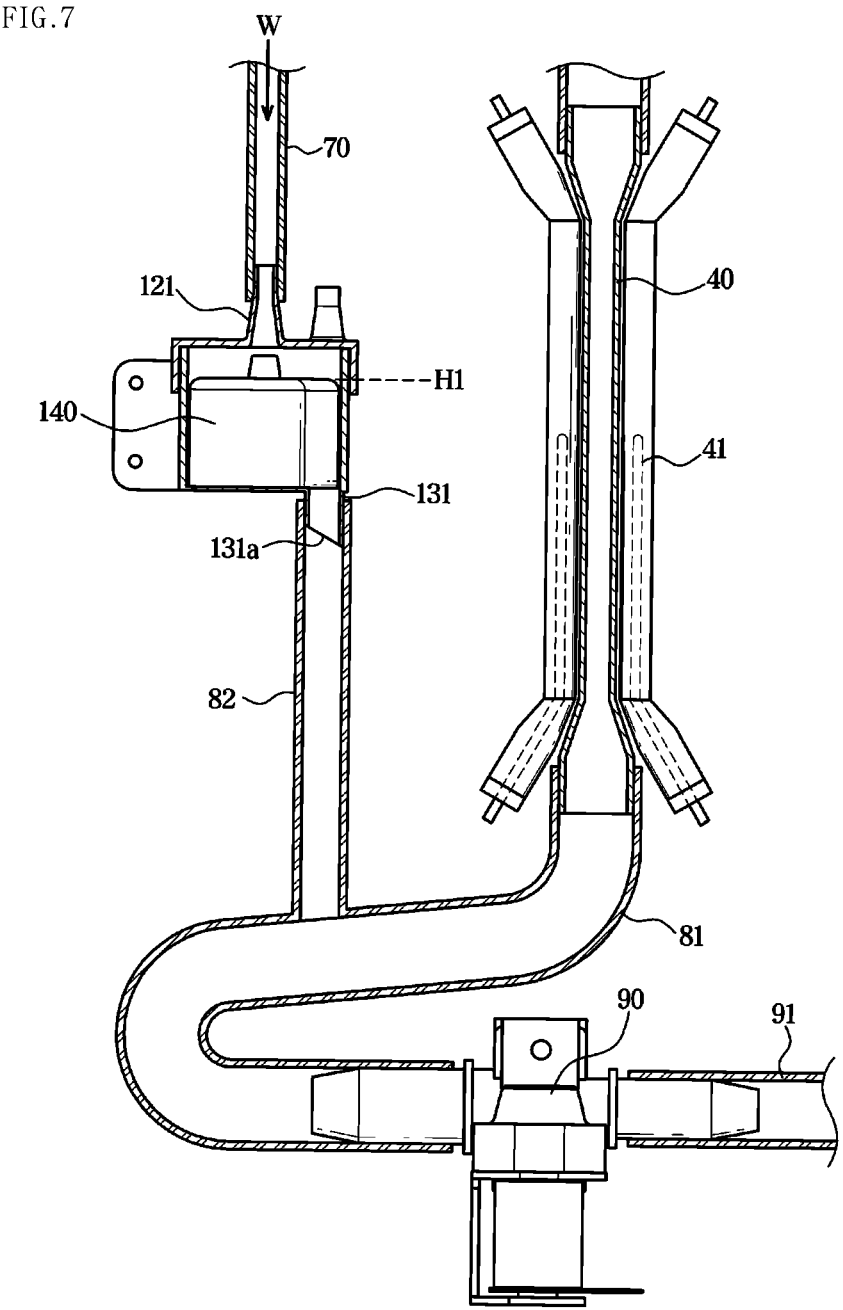
FIG. 7 is a view illustrating a state in which water is supplied to some components of the cooking apparatus according to an embodiment of the disclosure.
Figure 8:
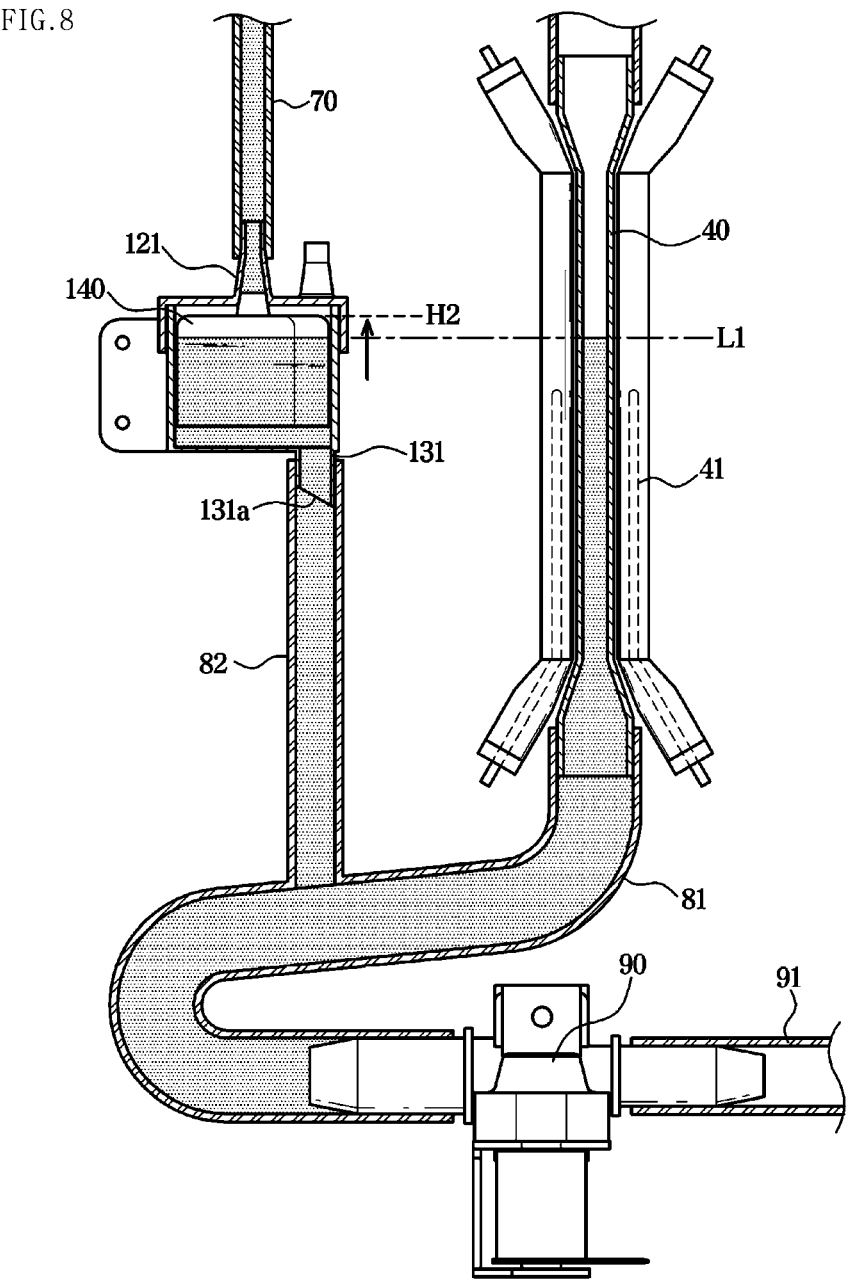
FIG. 8 is a view illustrating a state in which water is supplied to some components of the cooking apparatus according to an embodiment of the disclosure.
Figure 9:
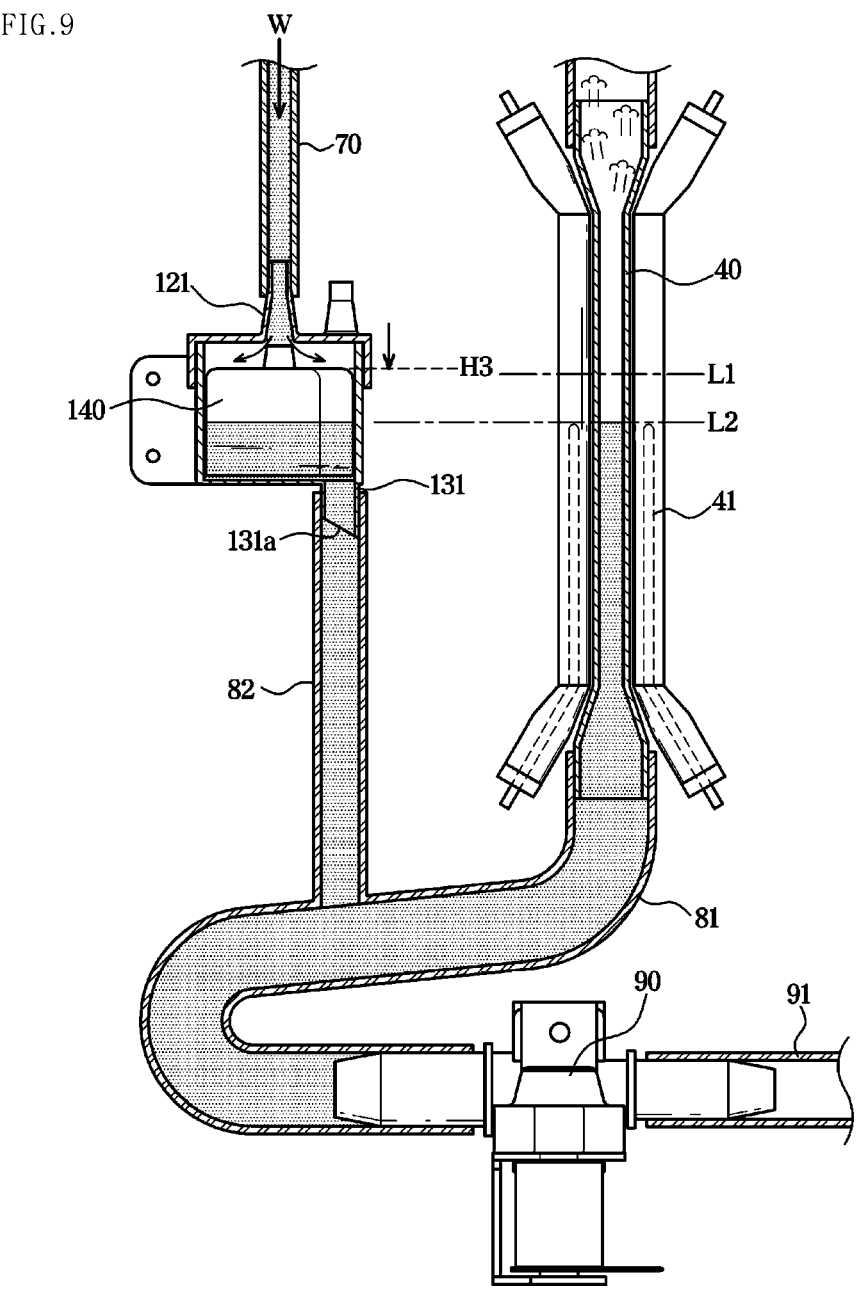
FIG. 9 is a view illustrating a state in which water is supplied to some components of the cooking apparatus according to an embodiment of the disclosure.
Figure 10:
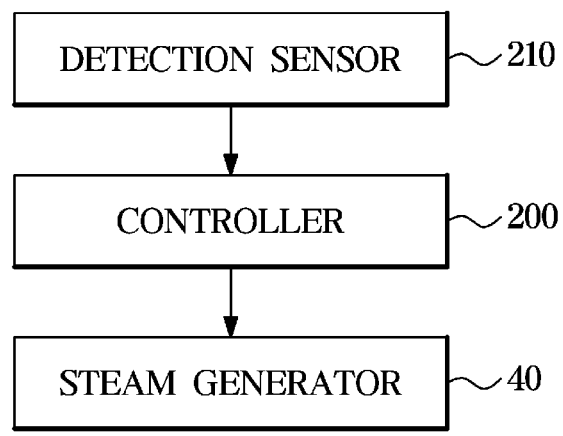
FIG. 10 is a schematic block diagram of an operation of the cooking apparatus according to an embodiment of the disclosure.
Figure 11:
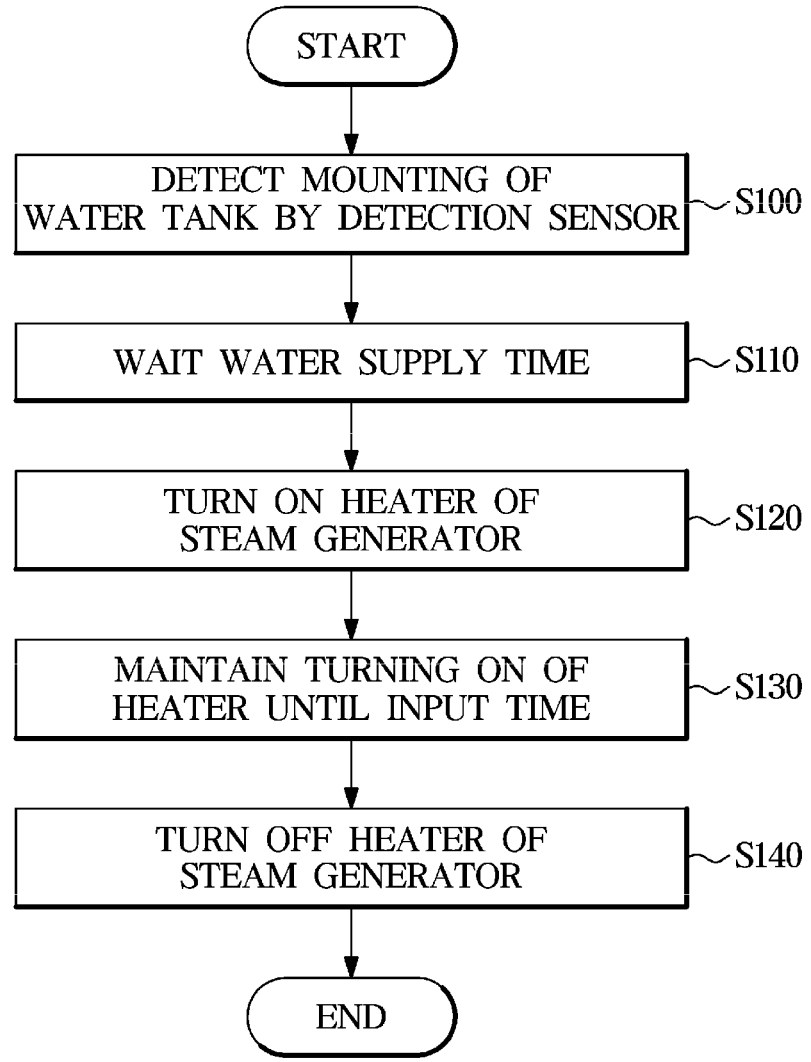
FIG. 11 is a schematic flow chart of a sequence of the operation of the cooking apparatus according to an embodiment of the disclosure.

FIGS. 7 to 9 are views illustrating a state in which water is supplied to some components of the cooking apparatus according to an embodiment of the disclosure, FIG. 10 is a schematic block diagram of an operation of the cooking apparatus according to an embodiment of the disclosure, and FIG. 11 is a schematic flow chart of a sequence of the operation of the cooking apparatus according to an embodiment of the disclosure.

The heater 41 configured to generate steam by heating water stored in the steam generator 40 may be provided inside the steam generator 40. When a certain amount of water is not stored in the steam generator 40, it may cause a problem that the heater 41 is overheated, and it may cause a lack of the steam. Therefore, the efficiency of the steam generator 40 may be reduced and the steam generator 40 may be not operated stably.

In the conventional manner, in order to adjust the water in the steam generator to a predetermined amount, a water level sensor may be provided to detect a water level of the steam generator and a component such as a pump may supply water to the inside of the steam generator according to the water level that is detected by the water level sensor.

Therefore, a complicated electric circuit is provided to measure the water level of the steam generator and to supply water, and due to the additional component, the size of the cooking apparatus may be increased and the reliability of the cooking apparatus may be lowered.

In order to solve such a problem, the cooking apparatus 1 according to an embodiment may not include an electric circuit configured to identify a time for supplying water for the steam generator 40 or an electric pump or valve configuration for automatically supplying water at the water supply time, but include the water supply control valve 100 configured to simply and stably supply water to the steam generator 40.

The water supply control valve 100 is configured to be opened or closed by a difference between the buoyancy of the float 140 and the gravity caused by the weight of water flowing into the water supply control valve 100, and the float 140 is configured to automatically open or close the water supply control valve 100 according to a water level of the steam generator 40. Therefore, it is possible to easily supply water to the inside of the steam generator 40 without a separate component or an electric circuit.

That is, the buoyancy of the float 140 may be set to be greater than the gravity caused by the weight of the water flowing from the water supply device 60 into the water supply control valve 100. Accordingly, the float 140 moves upward in the valve housing 110 due to the buoyancy of the water stored in the water supply control valve 100, thereby closing the inlet portion 121, and it is possible to prevent water from further flowing into the valve housing 110 during the opening and closing portion 144 closes the inlet portion 121. This will be described in detail below.

As illustrated in FIG. 7, the water stored in the water supply device 60 may flow into the water supply control valve 100 through the water supply pipe 70 before the steam generator 40 is driven. At this time, the drain valve 90 may be driven in the closed state.

When water is not supplied to the water supply control valve 100, the float 140 may be arranged on the bottom surface of the valve housing 110, and at this time, a height of the upper surface 141 of the float 140 is assumed to be H1.

As water stored in the water supply device 60 continuously flows into the water supply control valve 100, the water may be stored in the connection pipe 80 and the steam generator 40 through the outlet portion 131 of the water supply control valve 100. The outlet portion 131 may include a cutout portion 130a. Water may start to be stored in the connection pipe 80 and at the same time start to be stored in the water supply control valve 100 and the steam generator 40. At this time, the water supply control valve 100 and the steam generator 40 are arranged to allow the water level of the water supply control valve 100 and the steam generator 40 to be approximately the same, and thus the water level of the water supply control valve 100 and the steam generator 40 may become the same in the vertical direction.

As illustrated in FIG. 8, as a predetermined amount of the water is stored in the water supply control valve 100, the float 140 may move upward by the buoyancy. That is, the upper surface 141 of the float 140 may moves above H1.

As the float 140 moves upward, the opening and closing portion 144 arranged on the upper end of the float 140 may close the inlet portion 121 of the water supply control valve 100.

As described above, because the buoyancy of the float 140 is set to be greater than the weight of the water flowing through the water supply pipe 70, the water stored in the water supply pipe 70 does not push the opening and closing portion 144 downward, and thus the opening and closing portion 144 stably closes the inlet portion 121.

When it is assumed that upon closing of the opening and closing part 144 by the inlet portion 121, a water level of the water supply control valve 100 and the steam generator 40 is L1 and a height of the upper surface 141 of the float 140 is H2, H2 may be arranged above H1.

Further, a height of the L1 may be at a position higher than an upper end of the heater 41 of the steam generator 40.

When the water level of the steam generator 40 is higher than the upper end of the heater 41 of the steam generator 40, the heater 41 may efficiently heat water to generate a certain amount of steam, and it is possible to prevent the heater 41 from being overheated.

When the water level of the steam generator 40 is increased up to L1, the heater 41 may be heated to drive the steam generator 40. Thereafter, as the water stored in the steam generator 40 is evaporated, the amount of water stored in the steam generator 40 may decrease, as illustrated in FIG. 9.

Because the amount of the water of the steam generator 40 is reduced, the water level of the steam generator 40 may be lowered and the water level of the water supply control valve 100 may be lowered in conjunction therewith.

As the water level of the water supply control valve 100 is lowered, the float 140 may move downward. Accordingly, as the opening and closing portion 144 moves downward and the inlet portion 121 is opened, the water stored in the water supply pipe 70 may flow again into the water supply control valve 100.

As the inlet portion 121 is opened, water may be supplied to the steam generator 40 through the connection pipe 80, as well as the water supply control valve 100. Accordingly, when the water level of the steam generator 40 is lowered equal to or less than a predetermined height, the steam generator 40 may automatically receive water through the water supply control valve 100.

Accordingly, when the amount of water stored in the steam generator 40 is reduced and thus the amount of water is reduced equal to or less than a predetermined amount, the steam generator 40 may automatically receive water through the water supply control valve 100 again.

When it is assumed that a height of the water level of the water supply control valve 100 and the steam generator 40 when water starts to be supplied is L2 and at this time, a height of the upper surface of the float 140 is H3, the height of L2 may be higher than the upper end of the heater 41.

Accordingly, even when water starts to be supplied into the steam generator 40, the heater 41 may be stably driven.

As described above, the water supply control valve 100 is opened and closed according to the vertical movement of the float 140 of the water supply control valve 100, and the movement of the float 140 is performed in conjunction with the water level of the water supply control valve 100 and the steam generator 40. Therefore, without an additional component, it is possible to automatically supply water to the steam generator 40 based on the water level of the steam generator 40 being lowered equal to or less than a predetermined height.

Further, the water supply device 60 is arranged above the water supply control valve 100 and the steam generator 40, and the water is supplied to the water supply control valve 100 and the steam generator 40 by the free flow of the water by the weight of the water stored in the water supply device 60. Therefore, without an additional component such a supply pump, it is possible to easily supply water to the steam generator 40.

Accordingly, it is possible to supply water to the steam generator 40 with a minimum configuration, and thus it is possible to make the cooking apparatus 1 corn pact.

In addition, because the water supply control valve 100, in which a size thereof is minimized due to the cutting portion 143 of the float 140 and the cutout portion 131a of the outlet portion 131, is installed to the cooking apparatus 1, it may be possible to make the cooking apparatus 1 compact.

The cooking apparatus 1 may include a controller 200 configured to control the steam generator 40 and other electronic components. The controller 200 may control the steam generator 40 through a simple electric circuit configuration.

That is, in the conventional manner, the controller additionally includes an additional electric circuit for determining and detecting whether the water level of the steam generator is an appropriate level. However, the controller 200 according to an embodiment of the disclosure may simply control the steam generator 40 without the electronic circuit.

Particularly, the water supply device 60 includes a detection sensor 210 configured to detect whether water is supplied to the water tank 62 and whether the water tank 62 is arranged at the second position P2. The detection sensor 210 may transmit a detection signal to the controller 200.

The controller 200 receives a signal from the detection sensor 210 (100) and the controller 200 does not drive the heater 41 until the water is supplied from the water supply device 60 to the steam generator 40 and the water level of the steam generator 40 becomes L1 (110). After the waiting time, the controller 200 drives the heater 41 (120). The controller 200 periodically drives the heater 41 for a predetermined period of time (130) and when the predetermined period of time elapses, the controller 200 may terminate the driving of the heater 41 (140).

That is, the controller 200 may stably drive the steam generator 40 through a simple control of turning on/off the heater 41 after a predetermined waiting time after receiving a signal from the detection sensor 210.

In the conventional manner, the water level of the steam generator is checked in real time while the heater is driven, and when the water level is lowered equal to or less than a certain height, a solenoid valve or a pump is driven to supply water to the steam generator. However, the controller 200 according to an embodiment may drive the steam generator 40 through a simple control of turning on/off the heater 41 without such additional control.

Hereinafter a water supply control valve 100 of a cooking apparatus 1 according to another embodiment of the disclosure will be described. A configuration other than the configuration of the water supply control valve 100 described below is the same as the water supply control valve 100 and the cooking apparatus 1 according to an embodiment of the disclosure described above, and thus a description thereof will be omitted.

Figure 12:
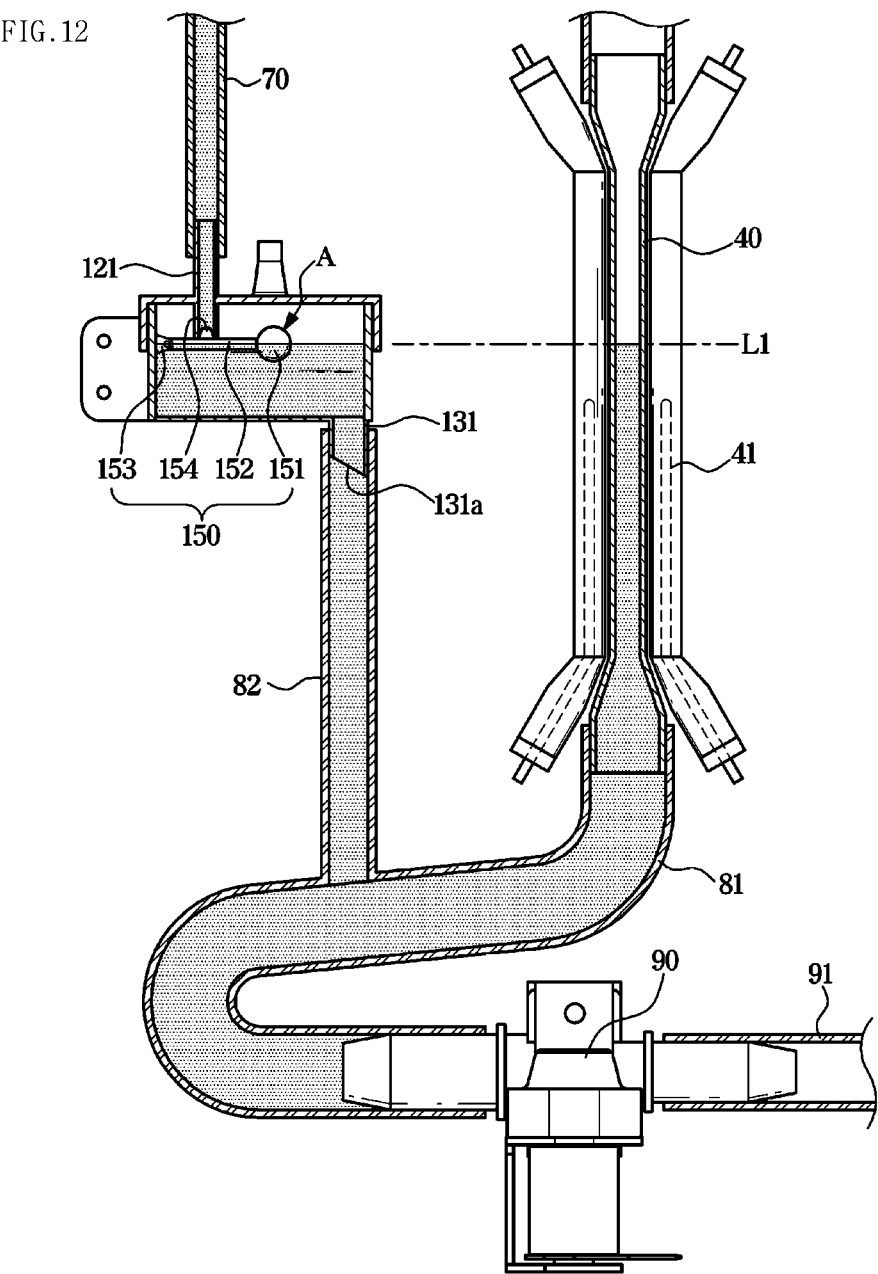
FIG. 12 is a view illustrating a state in which water is supplied to some components of a cooking apparatus according to another embodiment of the disclosure.
Figure 13:
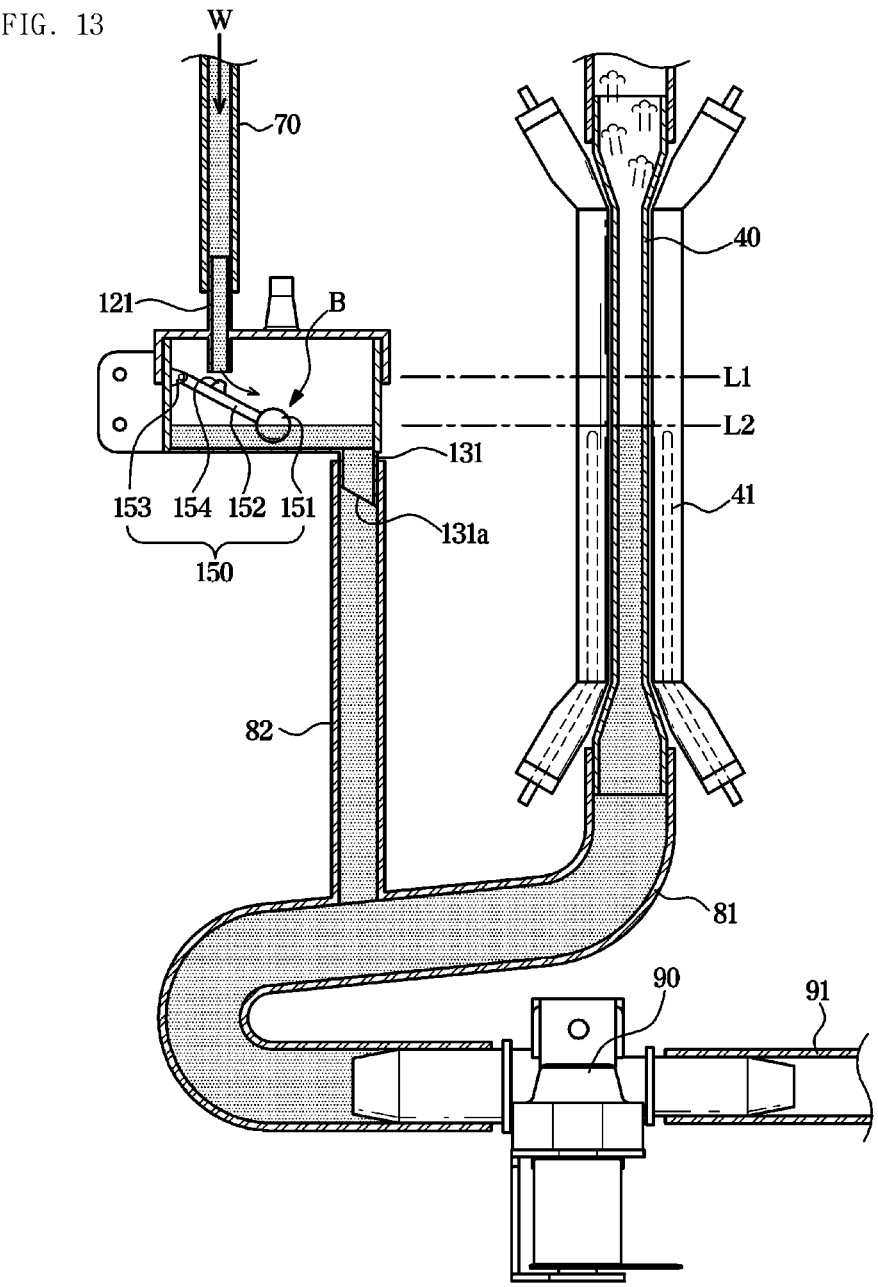
FIG. 13 is a view illustrating a state in which water is supplied to some components of the cooking apparatus according to another embodiment of the disclosure.

FIGS. 12 and 13 are views illustrating a state in which water is supplied to some components of a cooking apparatus according to another embodiment of the disclosure.

A water supply control valve 100 may include a floating device 150 configured to selectively open and close an inlet portion 121 according to the water level of a valve housing 110.

The floating device 150 may include a float 151 moving in the vertical direction by the buoyancy according to the water level of the valve housing 110, a rotating member 152 having one side thereof connected to the float 151, an opening and closing portion 154 connected to the other side of the rotating member 152 to open and close the inlet portion 121 according to the vertical movement of the float 151, and a rotator 153 arranged on an end portion of the rotating member 152 to be rotatable according to the vertical movement of the float 151.

As illustrated in FIG. 12, when the water level of the water supply control valve 100 and the steam generator 40 is L1, the float 151 may move upward according to the water level of the water supply control valve 100. The opening and closing portion 154 may move upward in conjunction with the float 151 and the rotating member 152 so as to close the inlet portion 121.

As illustrated in FIG. 13, when the water stored in the steam generator 40 evaporates and the water level of the steam generator 40 and the water supply control valve 100 is lowered to L2, the float 151 may move downward according to the water level of the water supply control valve 100. The opening and closing portion 154 may move downward in conjunction with the float 151 and the rotating member 152 so as to open the inlet portion 121.

Hereinafter a water supply control valve 100 of a cooking apparatus 1 according to still another embodiment of the disclosure will be described. A configuration other than the configuration of the water supply control valve 100 described below is the same as the water supply control valve 100 and the cooking apparatus 1 according to an embodiment of the disclosure described above, and thus a description thereof will be omitted.

Figure 14:
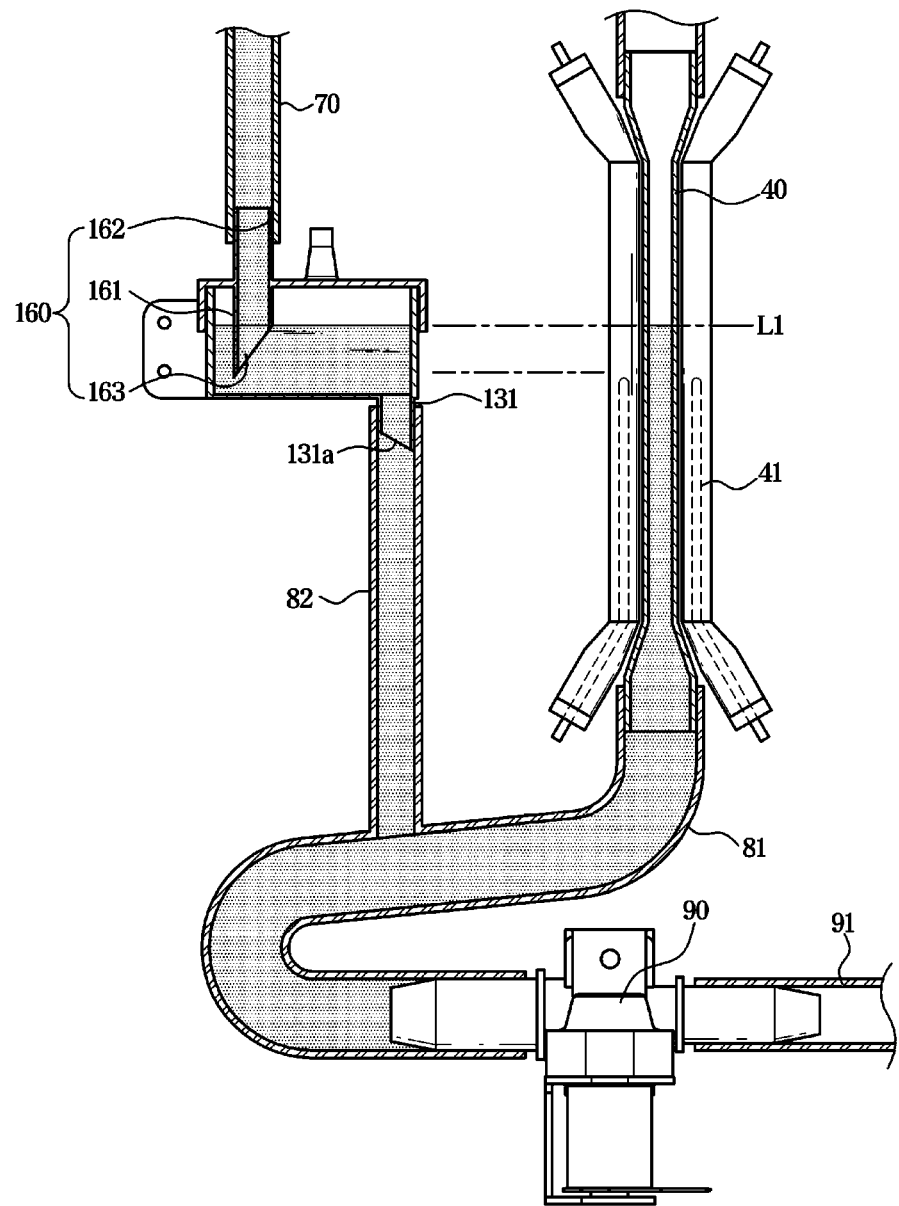
FIG. 14 is a view illustrating a state in which water is supplied to some components of a cooking apparatus according to still another embodiment of the disclosure.

FIGS. 14 and 15 are views illustrating a state in which water is supplied to some components of a cooking apparatus according to still another embodiment of the disclosure.

A water supply control valve 100 may include an inlet portion 160, and the inlet portion 160 includes an inlet 162 connected to the water pipe 70 and an extension tube 161 configured to extend to the inside of a valve housing 110 to supply water to the valve housing 110.

The extension tube 161 may include an inclined portion 163 formed to be cut obliquely about the vertical direction. The inclined portion 163 may be formed in such a way that a cross section in the vertical direction is increased from the lower side to the upper side.

An upper end of the inclined portion 163 may be arranged at a height corresponding to L1, which is a level when water supply is stopped to the steam generator 40 and the water supply control valve 100.

Because the inclined portion 163 is provided in a shape in which a portion of the tubular shape is cut off, at least a part of the inclined portion 163, which is a part placed higher than the water level of the steam generator 40 and the water supply control valve 100, may be exposed to the outside when the water level of the steam generator 40 and the water supply control valve 100 is lowered equal to or less than L1. Therefore, the water stored in the water pipe 70 may flow into the inside of the valve housing 110 by the gravity.

When the water level of the steam generator 40 and the water supply control valve 100 is lowered equal to or less than L1, the water stored in the water pipe 70 may continuously flow into the inside of the valve housing 110 by the weight of the water, and thus the entire of the inclined portion 163 may be immersed in the water so as not to be exposed to the outside. Therefore, the water stored in the water pipe 70 may be stopped from flowing into the inside of the water supply control valve 100.

That is, when the water level of the steam generator 40 and the water supply control valve 100 is lowered equal to or less than L1, the water level of the water supply control valve 100 and the steam generator 40 may be raised to L1 again by the free flow of the water stored in the water pipe 70 because the upper end of the inclined portion 163 is arranged at the same or higher position than L1.

As is apparent from the above description, it is possible to easily open and close a water supply control valve so as to supply water to a steam generator because the water supply control valve includes a float and the float moves in the vertical direction according to a water level of the water supply control valve.

Further, because the water supply control valve is opened and closed by the free flow of water in a water supply device and the buoyancy of the float, the water supply control valve may be driven without an additional component such as a pump and an electrical signal of a controller.

Although a few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:
1. A cooking apparatus comprising:
a cavity;
a steam generator arranged at a rear of the cavity and configured to generate steam;
a water supply device arranged above the cavity and configured to supply water to the steam generator;
a steam pipe configured to connect the steam generator to the cavity to supply the steam generated by the steam generator to the cavity;
a water supply control valve arranged between the water supply device and the steam generator and configured to adjust a level of water in the steam generator, the water supply control valve including:
a housing,
an inlet portion arranged on an upper end of the housing, and
a float, moveable along a vertical direction of the housing, such that the float moves upward along the vertical direction within the housing to open the inlet portion while a level of water in the housing is at a first level, and the float moves downward along the vertical direction within the housing to close the inlet portion while the level of water in the housing is at a second level above the first level, the float having a side surface where an edge of the side surface of the float comprises a cutting portion such that while the float moves along the vertical direction within the housing, the cutting portion of the float is recessed along the vertical direction to be more spaced apart from two adjacent inner side surfaces forming an inner edge of the housing along the vertical direction of the housing than another edge of the side surface of the float,
an outlet portion, in a tubular shape, formed to extend along a vertical direction from a lower end of the housing to discharge water in the housing to an outside of the housing, the outlet portion having a bottom surface that is inclined relative to the vertical direction and the outlet portion is formed such that a cross section of the outlet portion along the vertical direction increases from the bottom surface of the outlet portion to a top surface of the outlet portion,
a water supply pipe configured to connect the water supply device to an upper end of the water supply control valve;
a connection pipe configured to connect a lower end of the water supply control valve to a lower end of the steam generator, the connection pipe being configured to accommodate at least a portion of the outlet portion so that the bottom surface of the outlet portion that is inclined relative to the vertical direction is inside the connection pipe to thereby allow water in the water supply control valve introduced through the inlet portion to be discharged through the outlet portion and flow into the steam generator through the connection pipe; and
a drain valve to be connected to the connection pipe, and while the drain valve is connected to the connection pipe, the drain valve is configured to discharge water in the water supply control valve, the steam generator, and the connection pipe,
wherein a buoyancy of the float is greater than gravity caused by a weight of the water supplied by the water supply device and flowing to the water supply control valve.

2. The cooking apparatus of claim 1, wherein the water supply device is arranged above the water supply control valve.

3. The cooking apparatus of claim 1, wherein while the drain valve is in a closed state, the level of water in the housing is same as the level of water in the steam generator along the vertical direction.

4. The cooking apparatus of claim 3, wherein the steam generator comprises a heater configured to heat the water in the steam generator,
wherein, when the water in the steam generator evaporates due to heat by the heater and the level of water of the steam generator is lowered, the level of water in the housing is lowered in conjunction as the water in the water supply control valve flows through the outlet portion to the connection pipe, and the float moves downward so as to open the inlet portion.

5. The cooking apparatus of claim 4, wherein while the inlet portion is opened, water flows into the water supply control valve through the water supply pipe and the water flowing into the water supply control valve flows into the steam generator through the connection pipe, thereby increasing the level of water in the steam generator.

6. The cooking apparatus of claim 5, wherein the float closes the inlet portion when the level of water in the housing is increased to a predetermined height.

7. The cooking apparatus of claim 1, wherein the water supply device comprises:
a water tank configured to store water, and
a pressure adjustment hole configured to connect the water tank to an outside of the water tank to allow water stored in the water tank to be affected by atmospheric pressure.

8. The cooking apparatus of claim 7, further comprising:
a controller,
wherein the water tank is moveable between a first position in which the water tank is exposed to an outside of the cooking apparatus to receive water, and a second position in which the water tank is inside the water supply device so as to cause water to flow to the water supply pipe, and
while the water tank is in the second position, the controller drives the steam generator after a predetermined period of time.

9. The cooking apparatus of claim 1, wherein the water supply control valve comprises:
a pressure adjustment hole arranged on an upper end of the housing to connect the housing to an outside of the housing to allow water flowing into the housing to be affected by atmospheric pressure.

10. The cooking apparatus of claim 1, wherein the float comprises:
an opening and closing portion arranged at an upper end of the float to open and close the inlet portion according to the level of water in the housing.

11. The cooking apparatus of claim 1, wherein the connection pipe comprises:
a first connection pipe configured to connect the steam generator to the drain valve, and
a second connection pipe connected to the water supply control valve and a part of the first connection pipe.

12. The cooking apparatus of claim 1, wherein the water supply control valve further comprises:
a rotating member having one side connected to the float, and an opening and closing portion connected to another side, where the rotating member is configured to open and close the inlet portion in conjunction with a vertical movement of the float.

13. A cooking apparatus comprising:
a cavity;
a steam generator arranged at a rear of the cavity and configured to generate steam;
a water supply device arranged above the cavity and configured to supply water to the steam generator;
a steam pipe configured to connect the steam generator to the cavity to supply the steam generated by the steam generator to the cavity;
a water supply control valve arranged between the water supply device and the steam generator and configured to adjust a level of water in the steam generator, the water supply control valve including:
a housing,
an inlet portion arranged on an upper end of the housing,
an outlet portion, in a tubular shape, formed to extend in along a vertical direction from a lower end of the housing to discharge water in the housing to an outside of the housing, the outlet portion having a bottom surface that is inclined relative to the vertical direction and the outlet portion is formed such that a cross section of the outlet portion along the vertical direction increases from the bottom surface of the outlet portion to a top surface of the outlet portion,
a float, moveable along a vertical direction of the housing, such that the float moves upward along the vertical direction within the housing to open the inlet portion while a level of water in the housing is at a first level, and the float moves downward along the vertical direction within the housing to close the inlet portion while the level of water in the housing is at a second level above the first level, the float including:
an opening and closing portion arranged at an upper end of the float to open and close the inlet portion,
a side having a cutting portion at an edge formed by being cut out to be more spaced apart from two adjacent inner side surfaces of the housing along the vertical direction than another edge of the side of the float,
a water supply pipe configured to connect the water supply device to an upper end of the water supply control valve, the inlet portion being connected to the water supply pipe;
a connection pipe configured to connect a lower end of the water supply control valve to a lower end of the steam generator, the connection pipe being configured to accommodate at least a portion of the outlet portion of the water supply control valve so that the bottom surface of the outlet portion that is inclined relative to the vertical direction is inside the connection pipe to thereby allow the water in the housing to be discharged to the outside of the housing and flow into the steam generator through the connection pipe; and
a drain valve to be connected to the connection pipe, and while the drain valve is connected to the connection pipe, the drain valve is configured to discharge water in the water supply control valve, the steam generator, and the connection pipe.

* * * * *